United States Patent [19]
Lang

[11] 3,712,202
[45] Jan. 23, 1973

[54] MULTIPLE SHUTTER SYSTEM FOR CAMERAS AND PROJECTORS

[75] Inventor: Paul Wentworth Lang, Westlake Village, Calif.

[73] Assignee: Michael H. DuPont, Los Angeles, Calif., part interest

[22] Filed: June 16, 1971

[21] Appl. No.: 153,623

[52] U.S. Cl. ...................95/58, 95/18 R, 95/53 E, 95/53 EA, 355/54, 352/208
[51] Int. Cl..............................................G03b 9/52
[58] Field of Search.95/58, 53 R, 53 E, 53 EA, 36 R, 95/18 R, 18 P; 355/54, 46; 352/208; 353/91; 350/167

[56] References Cited

UNITED STATES PATENTS

| 3,323,432 | 6/1967 | Rabanit | 95/18 P |
|---|---|---|---|
| 2,618,087 | 11/1952 | Hutchison, Jr. | 95/18 R X |
| 525,439 | 9/1894 | Blackmore | 95/36 R |
| 3,442,588 | 5/1969 | Squassoni et al. | 95/53 R X |
| 2,347,699 | 5/1944 | Magnus et al. | 95/53 E |

FOREIGN PATENTS OR APPLICATIONS

| 687,654 | 2/1953 | Great Britain | 95/53 E |

Primary Examiner—Robert P. Greiner
Attorney—Pastoriza & Kelly

[57] ABSTRACT

Side by side columns each comprising a plurality of shutters are positioned to co-operate with a rectangular array of lenses such that operation of any one shutter permits light to pass through an associated lens. The shutters take the form of axially aligned cylinders individually rotatably mounted to form the columns. Each cylinder has a lateral bore such that in one rotated position light is blocked and in a second rotated position light can pass through the bore. A variable speed drive motor with co-operating drive shafts applies rotative biasing forces on all of the cylinders simultaneously. Stop means associated with each of the cylinders holds the cylinders in their first rotated or light blocking positions. Individual operation of any one stop means serves to release the cylinder momentarily to permit it to make a half rotation whereby it passes throught its second rotated position to permit light to pass through the associated lens. The stop means may be designed such that the cylinder can be stopped in its second rotated position for any desired length of time.

3 Claims, 6 Drawing Figures

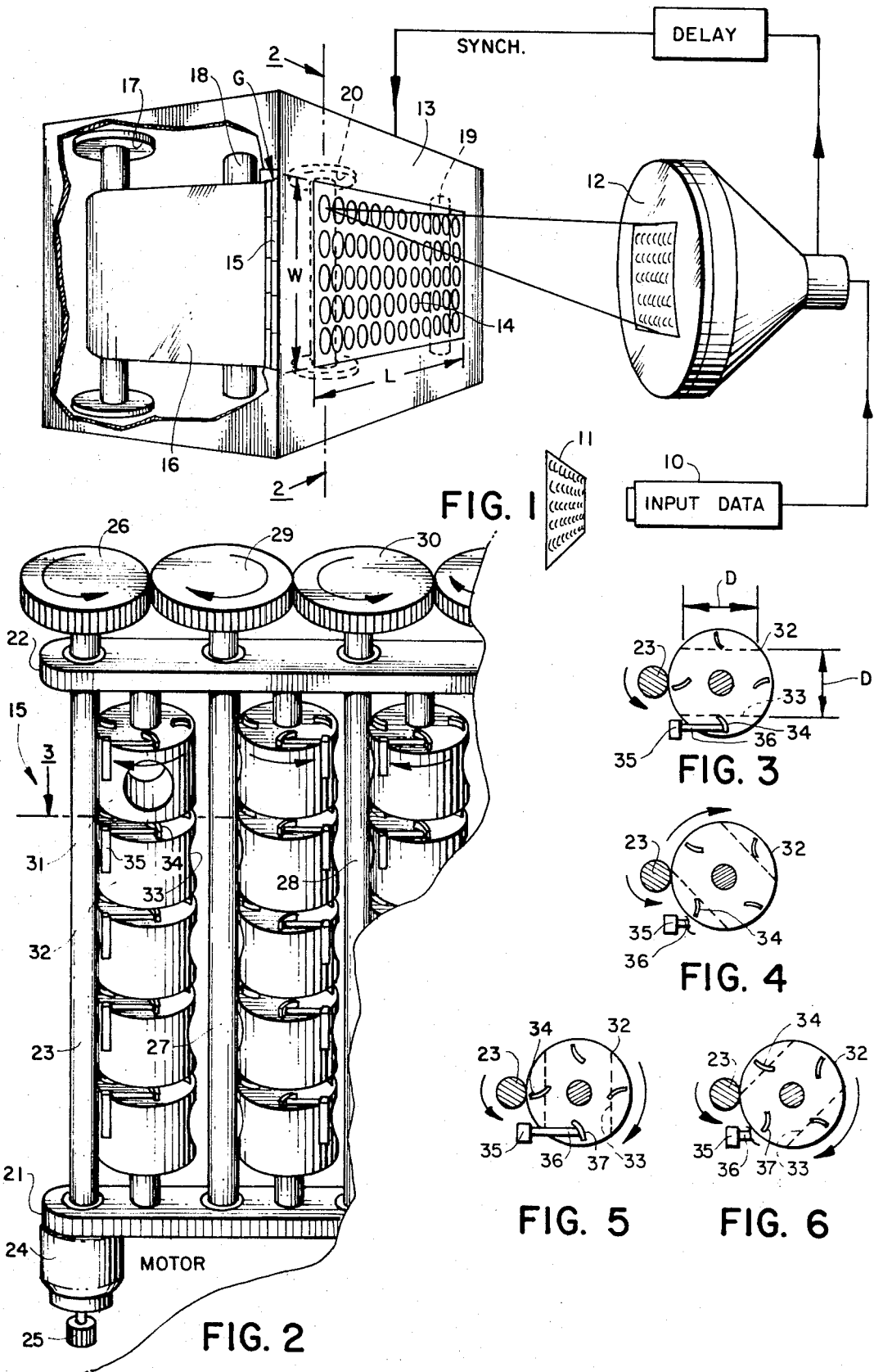

MULTIPLE SHUTTER SYSTEM FOR CAMERAS AND PROJECTORS

This invention relates generally to photographing and projection techniques and more particularly to a novel multiple shutter system for co-operation with a multiple lens array used in a camera or projector.

BACKGROUND OF THE INVENTION

In my co-pending patent application Ser. No. 124,010 filed Mar. 15, 1971 and titled MULTIPLE IMAGE FILM EXPOSURE AND PROJECTION SYSTEM, there is described a novel method and apparatus for exposing a microfiche film by means of a multiple lens system. A plurality of individual image forming lenses which may be in the form of a single integral plate of glass upon which rows and columns of lenses are formed is positioned in front of the camera gate to project multiple images of any particular scene disposed in front of the camera on the microfiche film frame. The images respectively occupy the small areas to be exposed and are all identical. By utilizing a multiple shutter arrangement, the particular picture may be imaged onto any one selected area of the microfiche film by opening the corresponding shutter associated with the individual lens positioned to project the image on such area, all of the other shutters remaining closed. The next picture or scene can be displayed and another shutter open and closed to effect another exposure in a desired position relative to the first exposure thereby permitting rapid sequential exposure of a microfiche film with different pictures without having to mechanically move the camera.

In the foregoing arrangement as well as in any corresponding readout device such as described in the aforementioned pending patent application, for proper focusing and reasons of compactness, the individual lenses in the multiple lens array must be spaced relatively close together. As a result, conventional type shutters for the individual lenses cannot readily be accommodated behind the lenses without interferring with each other.

BRIEF DESCRIPTION OF THE PRESENT INVENTION

With the foregoing background in mind, the present invention contemplates a particular multiple shutter system ideally suited for use with a multiple lens arrangement as described in my co-pending application. More particularly, the multiple shutter arrangement permits a plurality of shutters to be individually associated respectively with the various lenses making up the lens array and to be operated rapidly and efficiently without interference with each other.

The foregoing is achieved in accord with the present invention by providing a plurality of individually rotatable shutters preferably in the form of individual cylinders, equal in number to the number of lenses, and associated respectively with the lenses. The cylinders are mounted in side by side columns, the cylinders in each column being axially aligned and individually rotatable. Each cylinder has a bore passing laterally therethrough so that in a first rotated position light is blocked from passing through the bore and associated lens and in a second rotated position light is passed through the bore and associated lens.

Drive shafts are provided passing parallel to the columns respectively and frictionally engaging the lateral sides of the cylinders in the columns so that rotation of the drive shafts places a constant biasing rotative force on each of the cylinders. A variable speed motor is coupled to rotate the drive shafts at a given selected speed. The assembly is completed by stop means associated with each cylinder normally holding the cylinders in their first rotated or light blocking positions. Each of these stop means which may comprise solenoids are responsive to an individual electrical signal to disengage and engage its associated cylinder thereby permitting the cylinder to effect one half a rotation between the times of engagement and disengagement so that the cylinder passes through the second rotated position to pass light through its associated lens for a time determined by the selected speed of rotation of the drive shafts.

The stop means also enable the individual cylinders to be stopped in their second rotated positions to provide a continuous passage of light.

BRIEF DESCRIPTION OF THE DRAWINGS

A better understanding of the invention will be had by now referring to the accompanying drawings in which:

FIG. 1 is a perspective view partly cutaway showing a camera enabling successive exposure of small areas on a given film frame from data displayed on a cathode ray tube, the camera incorporating the multiple shutter system of the present invention:

FIG. 2 is an enlarged fragmentary perspective view showing the basic components making up the multiple shutter system utilized in the structure of FIG. 1;

FIG. 3 is a schematic plan view partly in cross-section taken in the direction of the arrow 3 of FIG. 2 illustrating a first rotated position of a shutter component;

FIG. 4 is a view similar to FIG. 3 illustrating rotation of the shutter component;

FIG. 5 shows a second rotated position of the shutter component of FIG. 3, and

FIG. 6 illustrates a further rotation of the shutter component.

DETAILED DESCRIPTION OF THE INVENTION

In order to set the environment to facilitate an understanding of the present invention, there is shown schematically in FIG. 1 a camera with which the multiple shutter system may be used. This camera serves to expose a microfiche film frame by means of a multiple lens system as fully set forth in my heretofore referred to copending application.

Referring to the lower right hand portion of FIG. 1, there is indicated by the block 10 a data recorder which might take the form of a TV camera arranged to pick up data such as a picture 11 or a page of text and display the same on the face of a cathode ray tube 12. The scene or picture on the cathode ray tube 12 may be rapidly changed by substituting various data sheets or scenes for the page 11 in front of the block 10. Alternatively, the scene or picture on the cathode ray tube may simply change at a rapid rate in accord with computer data fed to the cathode ray tube. In either event, the displayed data is to be successively recorded on a film frame such as a microfiche wherein small areas of the film frames are successively exposed to the successive output data or pictures on the cathode ray tube.

This recording is effected by the camera 13 which is provided with means defining a plurality of individual image forming lenses 14 positioned in front of a gate means G. The length and width of the means defining the multiple image lenses 14 shown by the letters L and W correspond to the length and width of a single film frame supported in the gate means G. Thus there is generally provided a rectangular array of lenses. In accord with the present invention, there is incorporated individually operable normally closed shutter means 15 for each of the individual image forming lenses 14. These shutter means are positioned between the gate G and the multiple image forming lens structure. A film 16 is shown extending from a supply reel 17, about a guide roller 18, through the gate means G, guide roller 19, and to a pickup reel 20.

In the embodiment illustrated in FIG. 1, there is shown a synchronizing line passing from the cathode ray tube 12 to the shutter means 15 in the camera. A signal on the synchronizing line is passed to the shutter means 15 and utilized in a manner to operate desired individual shutters when the picture on the tube changes thus serving to close a previously opened shutter and open a next successive shutter to effect the next exposure in accord with the picture shown. A delay as shown by a block assures that the picture will be fully displayed on the tube 12 before the appropriate shutter is opened to effect the small frame exposure.

Because of the relative close spacing of the multiple lenses 14 as described in FIG. 1, conventional type camera shutters cannot conveniently be employed for each of the individual lenses. Thus, in accord with the present invention the shutter means 15 is provided. With particular reference to FIG. 2, this shutter means basically includes lower and upper supporting frame members 21 and 22 rotatably supporting a drive shaft 23. A motor 24 having a variable speed adjustable by a knob 25 serves to drive the shaft 23. The upper end of this shaft terminates in a coupling gear 26 for simultaneously effecting rotation of drive shafts 27 and 28 through coupling gears 29 and 30 respectively.

The shutter system itself includes a plurality of individual cylinders, equal in number to the number of lenses in the array of FIG. 1, the cylinders being mounted in side by side columns and the cylinders in each column being axially aligned and individually rotatable. The drive shafts 23, 27, 28 and so forth run parallel to the axis of the columns and individually frictionally engage the sides of the cylinders in the respective columns. Thus, for example, in the first column there are shown cylinders 31 and 32 engaged by the drive shaft 23 so that they are biased to rotate in the direction indicated by the arrows. Each of the cylinders includes a lateral bore passing therethrough so that in a first rotated position such as indicated by the cylinder 32 light is blocked from passing through the bore and associated lens and in a second rotated position such as illustrated by the cylinder 31 light is passed through the bore and associated lens.

Stop means are associated with each cylinder normally holding the cylinder in its first or light blocking rotated position. For example, the cylinder 32 has its bore 33 in this first rotated position and is held in this position by the stop means which takes the form of a catch means 34 and co-operating solenoid and plunger structure 35. The plunger for the solenoid 35 engages the catch 34 thereby preventing rotation of the cylinder.

Each of the other cylinders in the columns are similarly provided with catch means and co-operating solenoids and plungers. It will be understood that the individual solenoids are stationarily supported, their plungers being capable of extending or retracting to engage or disengage the catch means on the associated cylinder. Since all of the cylinders are biased rotatively, it will be evident that release of any one cylinder by retraction of the corresponding solenoid plunger will permit that cylinder to rotate.

OPERATION

The operation of the multiple shutter system can best be understood by now referring to FIGS. 3, 4, 5 and 6. FIG. 3 illustrates the particular cylinder 32 in its first rotated or light blocking position. Thus, the catch 34 is engaged by the plunger 36 associated with the solenoid 35. Rotation of the drive shaft 23 in a counterclockwise direction as shown will tend to rotate the cylinder 32 in a clockwise direction but this action is prevented by engagement of the plunger with the catch.

If now a signal is received on the solenoid to retract the plunger 36, the cylinder 32 will be released as indicated in FIG. 4 and thus will commence rotating in a clockwise direction. If it is desired to stop the cylinder in its second rotated position in which the bore is aligned with a corresponding lens so that light can pass through the same, the signal applied to the solenoid 35 is such that it will extend the plunger 36 to engage a next successive catch member 37 disposed at 90° circumferentially from the catch member 34. The cylinder may be held in this second rotated position for as long a time as desired as shown in FIG. 5.

When the solenoid is again energized by the signal, the plunger will be retracted and the cylinder 32 is then released and is free to rotate as indicated in FIG. 6. Normally it will be stopped in a first rotated position wherein light is blocked by again extending the plunger 36 to engage the next catch member.

While there are shown four catch means on each cylinder spaced circumferentially at 90°, it is possible that only two such catch means need be provided diametrically disposed. Release of one of the catch means will then permit one half a rotation so that the cylinder will rotate through the second rotated position in which the bore is aligned with the lens. With this arrangement, the exposure time will be a function of the speed of the rotation of the cylinder which in turn will depend upon the speed of the drive shaft and motor 24 of FIG. 2. By varying the speed of the motor as by the control knob 25, it will be clear that the "exposure" time for the film can be adjusted.

Since, however, the shutter system can be used with a readout or projection apparatus as well as with a camera wherein opening of an individual shutter will permit one frame to be projected or exposed on a viewing screen all as described in my referred to co-pending application, it is desirable to provide the four catches on each cylinder so that the cylinder can be stopped in its second rotated or light passing position to permit extended viewing.

The arrangement of the various shutter cylinders described in FIG. 2 is somewhat schematic and in an actual embodiment, the drive shafts such as the drive shaft 23, 27, and 28 would be disposed forward or backward of the axial column of cylinders so that the cylinders could be spaced more closely together in their side by side relationship. The diameter of the bore passing through the cylinder is preferably made exactly equal to the shortest lateral length measured internally of the cylinder so that the cylinders may be as small as possible and yet transmit the maximum amount of light. This relationship is depicted by dimension D in FIG. 3.

From the foregoing description, it will be evident that the present invention has provided a novel multiple shutter system particularly useful in combination with multiple image lenses wherein a sequencing of opening and closing of shutters can be very rapidly carried out by means of electrical signals whereby successive exposures can be efficiently made on a film such as a microfiche.

What is claimed is:

1. A multiple shutter system for blocking or passing light through one or more selected lens in a rectangular multiple lens array, comprising, in combination:
   a. a plurality of individual cylinders, equal in number to the number of lenses, associated respectively with the lenses, said cylinders being mounted in side by side columns, the cylinders in each column being axially aligned and individually rotatable, each cylinder having a bore passing laterally therethrough so that in a first rotated position light is blocked from passing through the bore and associated lens and in a second rotated position light is passed through the bore and associated lens;
   b. drive shafts passing parallel to the columns respectively and frictionally engaging the lateral sides of the cylinders in the columns so that rotation of the drive shafts places a constant biasing rotative force on each of the cylinders;
   c. a variable speed motor coupled to rotate said drive shafts at a given selected speed; and
   d. stop means associated with each cylinder normally holding said cylinders in their first rotated positions and responsive to an individual electrical signal to disengage and engage said cylinder thereby permitting said cylinder to effect one half a rotation between the times of engagement and disengagement so that the cylinder passes through said second rotated position to pass light through its associated lens for a time determined by the selected speed of rotation of said drive shafts.

2. The subject matter of claim 1, in which each of said stop means includes a solenoid and plunger, the associated cylinder having at least two diametrically opposite catch means for engagement by said plunger so that disengagement of the cylinder is effected by retracting said plunger from one of the catch means to release the cylinder and extension of said plunger positions it to engage the other of said catch means after rotation of the cylinder through one half a revolution.

3. The subject matter of claim 2, in which there are provided four catch means on each cylinder equally circumferentially spaced at 90° so that said cylinder may be engaged and stopped in its second rotated position for any desired length of time.

* * * * *